United States Patent [19]

Koehmstedt

[11] 4,192,963

[45] Mar. 11, 1980

[54] GROUNDING ELECTRODE AND METHOD OF REDUCING THE ELECTRICAL RESISTANCE OF SOILS

[75] Inventor: Paul L. Koehmstedt, Richland, Wash.

[73] Assignee: Battelle Memorial Institute, Richland, Wash.

[21] Appl. No.: 488

[22] Filed: Jan. 2, 1979

[51] Int. Cl.$^2$ ............................................. H01R 3/06
[52] U.S. Cl. ........................................ 174/6; 106/277; 252/62.2; 252/518; 405/263; 405/265
[58] Field of Search ...................... 174/6, 7; 252/518; 405/57, 258, 263, 264, 265, 303

[56] References Cited

U.S. PATENT DOCUMENTS

| | | | |
|---|---|---|---|
| 1,177,180 | 3/1916 | Garton | 174/7 |
| 1,681,644 | 8/1928 | Maple | 174/6 |
| 1,856,506 | 5/1932 | Preston | 174/6 |
| 1,976,919 | 10/1934 | Byrne | 174/7 |
| 2,558,159 | 6/1951 | Sanick | 174/6 |
| 3,029,302 | 4/1962 | Ledoux | 174/6 |
| 3,582,531 | 6/1971 | Sheelor | 174/6 |
| 3,857,991 | 12/1974 | Higashimura et al. | 174/6 |
| 3,930,111 | 12/1975 | Sheelor | 174/6 |
| 4,018,715 | 4/1977 | Tatum | 174/6 X |

FOREIGN PATENT DOCUMENTS

| | | | |
|---|---|---|---|
| 1590453 | 6/1970 | Fed. Rep. of Germany | 174/7 |
| 513432 | 5/1976 | U.S.S.R. | 174/6 |

OTHER PUBLICATIONS

*Chemical Abstracts,* vol. 80, 1974, p. 391, Abstract No. 114016s, Yoshihara, T. et al., "Decreasing Soil Resistance".

Dybalski, Jack N., paper entitled, "The Chemistry of Asphalt Emulsions", Fifty-Fifth Annual Meeting Transportation Research Board, Jan. 1976.

Koehmstedt, P. L. et al., "Use of Asphalt Emulsion Sealants to Contain Radon and Radium in Uranium Tailings", published Jan. 1977, by Battelle Pacific Northwest Laboratories, Richland, Washington.

*Primary Examiner*—Laramie E. Askin
*Attorney, Agent, or Firm*—Klarquist, Sparkman, Campbell, Leigh, Hall & Whinston

[57] ABSTRACT

A first solution of an electrolyte is injected underground into a volume of soil having negative surface charges on its particles. A cationic surfactant suspended in this solution neutralizes these surface charges of the soil particles within the volume. Following the first solution, a cationic asphalt emulsion suspended in a second solution is injected into the volume. The asphalt emulsion diffuses through the volume and electrostatically bonds with additional soil surrounding the volume such that an electrically conductive water repellant shell enclosing the volume is formed. This shell prevents the leaching of electrolyte from the volume into the additional soil. The second solution also contains a dissolved deliquescent salt which draws water into the volume prior to the formation of the shell. When electrically connected to an electrical installation such as a power line tower, the volume constitutes a grounding electrode for the tower.

18 Claims, 3 Drawing Figures

GROUNDING ELECTRODE AND METHOD OF REDUCING THE ELECTRICAL RESISTANCE OF SOILS

BACKGROUND OF THE INVENTION

1. Field of the Invention

The present invention relates to a method of lowering the electrical resistance of soils and to grounding electrodes comprising a volume of soil of lowered electrical resistance.

2. Description of the Prior Art

For safety and operational reasons it is common practice to ground electrical installations, such as power line towers and metal substation structures, by connecting the installation to the earth. One typical way of accomplishing this grounding is to bury metallic electrical conductors, such as a grid of copper rods, and connect the conductors to the installation. However, it is extremely expensive to use copper and other metallic conductors for grounding purposes. In addition, corrosion occurring at the surface of the metal reduces its effectiveness as a grounding connection. Also, the high scrap value of these materials makes them attractive to thieves.

It has been recognized that grounding is improved when an electrical installation is connected to soil having a lowered resistivity. To this end, copper sulfate and other salts have been spread on the surface so that they are carried underground when wetted, as by rain. These salts lower the resistivity of soil so that when a ground rod is driven into soil treated in this manner and connected to the electrical installation, improved grounding results. As an alternate method of applying salts to soil, salt filled tubes, such as shown in U.S. Pat. Nos. 3,582,531 and 3,930,111, have been buried. These tubes have openings which permit moisture to enter and carry the salts into the soil. Soil treating methods of these types are unsatisfactory because the salts leach from the treated soil. Consequently, only a temporary improvement in grounding results from such methods. More importantly, leaching of chemicals from treated soils can pollute ground water supplies and create other environmental problems.

These problems are only partially solved by treating soil with salts of low solubility such as described in U.S. Pat. No. 3,029,302.

In addition, injection of various other materials into the ground through hollow ground rods has also been explored. For example, U.S. Pat. No. 1,976,919 discloses the injection of a carbonaceous paste and U.S. Pat. No. 2,558,159 discloses the injection of substances which form an underground electrically conductive gel. U.S. Pat. No. 2,558,159 discloses still another substance which has been introduced into soil for grounding purposes.

However, none of these references discloses an improved soil treatment method in which the electrical conductivity of a volume of soil is enhanced by treatment with an electrolyte and the treated volume is at least partially enclosed within a water repellant electrically conductive layer bonded to additional soil surrounding the volume.

SUMMARY OF THE INVENTION

The present invention is a soil treatment method in which the electrical conductivity of a volume of soil is enhanced by the introduction of an electrolytic substance and the volume is at least partially enclosed within a water repellant electrically conductive layer.

As a more specific aspect of the invention, a first solution containing an electrolyte is introduced into a volume of soil. A second solution injected into the volume diffuses through it until it reaches additional soil surrounding the volume, whereupon it bonds with this surrounding soil to form a water repellant electrically conductive layer.

As a further feature of the invention, the first solution includes a charge neutralizing material which neutralizes surface charges on soil particles within the volume.

As still another aspect of the invention, the second solution contains a deliquescent material for drawing water into the volume prior to formation of the layer.

As another feature of the invention, the second solution includes an asphalt emulsion which diffuses through the volume and electrostatically bonds with additional soil surrounding the volume. Thus, a water repellant shell is formed which retains the electrolyte from the first solution within the volume.

As another more specific feature of the invention, the neutralizing material contained in the first solution comprises a cationic surfactant. In addition, the zeta potential of the surfactant is of opposite sign and of magnitude of at least as great as the magnitude of the zeta potential of soil particles within the volume so that the surfactant neutralizes the surface charges of the soil particles.

In accordance with another specific feature of the invention, the second solution contains a cationic asphalt emulsion having a zeta potential that is no greater than the zeta potential of the cationic surfactant in the first solution so that the second solution diffuses through the volume and electrostatically bonds with soil particles surrounding the volume to form a water repellant shell enclosing the volume.

A primary object of the invention is to provide an improved grounding electrode and method of producing the same.

Another object of the invention is to provide a grounding electrode suitable for safely and efficiently grounding high voltage electrical installations such as transmission towers and substations.

A further object of the invention is to provide a volume of soil with enhanced conductivity.

A still further object of the invention is to provide a method of producing a grounding electrode of a variable and controllable surface area.

Another object of the invention is to provide a method of rapidly producing a grounding electrode in situ with minimal installation costs.

A further object of the invention is to provide a method of producing a grounding electrode which is resistant to degradation by soil dehydration.

Another object of the invention is to provide a grounding electrode which is resistant to damage caused by leaching.

A further object of the invention is to provide a long lasting grounding electrode.

The foregoing and other objects, features and advantages of the present invention will become more apparent from the following detailed description which proceeds with reference to the accompanying drawings.

DESCRIPTION OF PREFERRED EMBODIMENT

Figures 1, 2, 3:
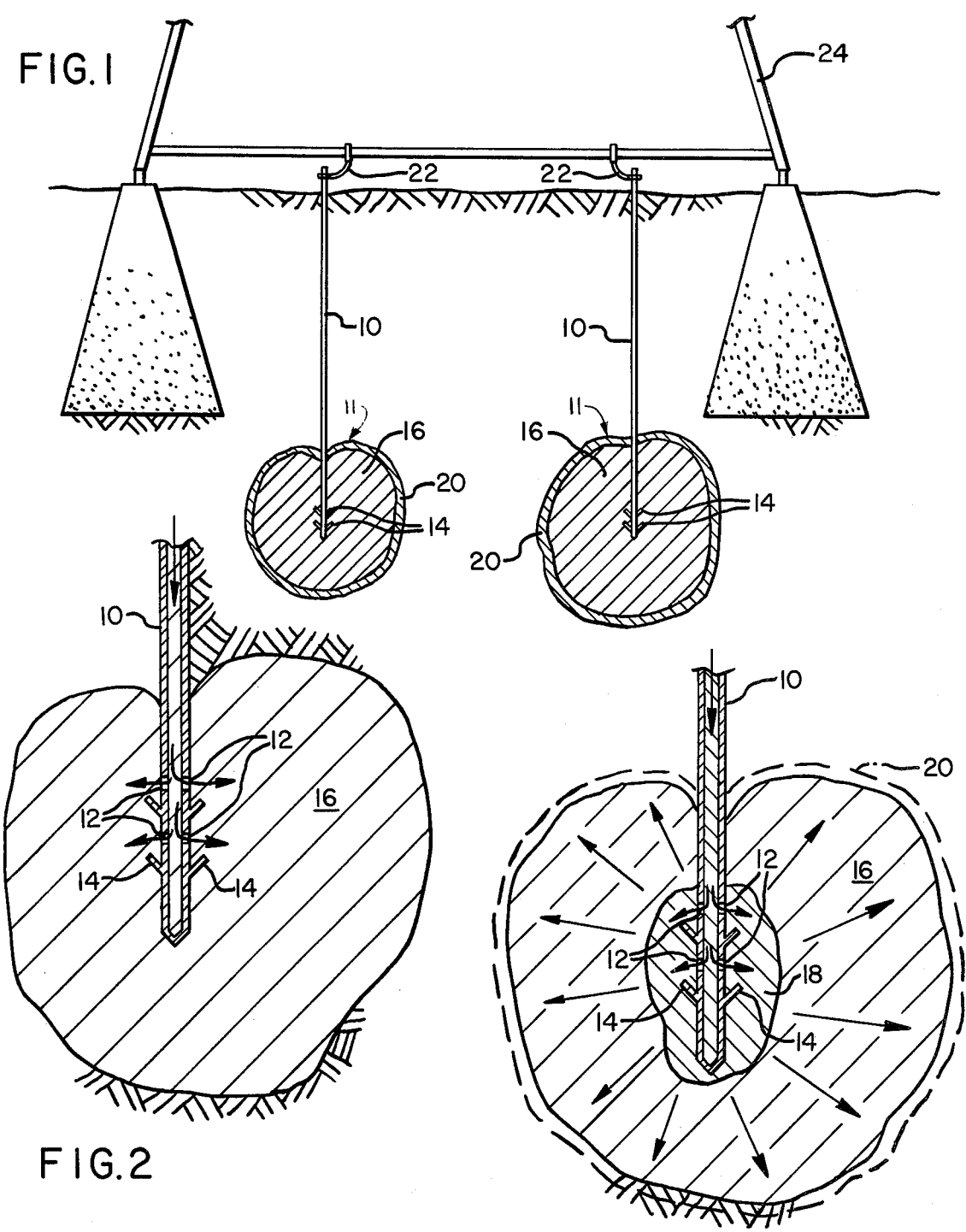
FIG. 1 is an elevational view of a portion of a power line tower grounded with a pair of grounding electrodes of the invention shown in section.
FIG. 2 is a representation of a cross-section of a volume of soil undergoing one step of the treatment process of the invention.
FIG. 3 is a representation of the volume of soil of FIG. 2 during a second step of the treatment process of the invention.

For convenience, and not to be construed as a limitation, the invention will be described in connection with the grounding of an electrical power line transmission tower.

As shown in FIG. 1, a hollow ground rod 10 of suitable electrically conducting material, such as stainless steel, is driven into the ground adjacent to a power line transmission tower 24. Barbs 14 make removal of rod 10 difficult and thereby discourages theft. The lower end of rod 10 penetrates a grounding electrode 11 formed in accordance with the present invention while the upper end is coupled by connectors 22 to the transmission tower. Hence, tower 24 is grounded by rod 10 through electrode 11 to the earth.

The electrode 11 is preferably formed by injecting a first electrolytic solution downwardly through the hollow interior of the ground rod 10 until it reaches openings 12 in the lower portion of the rod. At this point, the solution diffuses outwardly through soil surrounding the rod. The first solution can be injected under pressure to increase its rate of dispersion through the soil. The volume of soil 16 treated by this first solution is controlled by varying the amount of solution which is injected. Hence, the surface area of electrode 11 is both variable and controllable.

A second solution 18 is injected following the injection of the first solution. As illustrated in FIG. 3, this second solution 18 is such that it diffuses through the volume of soil 16 until it reaches additional soil surrounding the volume. The material from this second solution bonds with this additional soil and forms a water repellant electrically conductive layer at least partially enclosing the volume 16, as illustrated by dashed lines 20 in FIG. 3. This water repellant layer prevents leaching of material from the treated volume 16 into the additional soil.

First Solution

The first solution contains an electrolyte for enhancing the electrical conductivity of the volume of soil 16. In addition to the electrolyte, the first solution also contains a charge neutralizing substance for neutralizing surface charges which exist on soil particles within the volume prior to treatment.

Through testing, it has been determined that the vast majority, if not all, soil particles have a negative surface charge of varying intensity. Hence, for such soils, it is preferable that the electrolyte contain a water soluble small cation. In particular, it is preferable that the cation be selected from the group consisting of $Al^{+++}$, $Li^+$, $Mg^{++}$, $Ni^{++}$, $Co^{++}$, $Zn^{++}$ and $Fe^{++}$. These cations are readily available from weekly acidic solutions of the corresponding nitrate and chloride salts. A more specific example of a suitable electrolyte would be an aluminum nitrate $Al(NO_3)_3$ solution of 1000 parts per million concentration.

In addition, for soil particles having negative surface charges, a suitable charge neutralizing substance comprises a cationic surfactant material. These materials are commercially available and are commonly used in preparation of cationic asphalt emulsions. Typically, these surfactants are ethoxylates quaternary amines and ethoxylated diamines. The surface charge on these cationic surfactants is variable and controlled by the basic structure of the amine molecule and attached functional groups.

The charge intensity of the cationic surfactant is measured by a zeta meter and unit of measurement is the zeta potential. The zeta potential is the net difference in electrical potential between the surface of a dispersed colloidal particle and the bulk aqueous solution.

Hence, a suitable cationic surfactant would preferably have a positive zeta potential which is of a magnitude which is equal to or higher than the magnitude of the negative zeta potential of soil particles within the volume.

It should be noted that the charge range of soil particles varies considerably. However, treatment with 100 to 1000 parts per million concentrations of cationic surfactant has been found satisfactory for neutralizing particle charges of all soils tested to date.

Second Solution

The second solution preferably contains an asphalt emulsion for forming a water repellant layer surrounding volume 16. In addition, the second solution may contain a dissolved deliquescent material and a filler or thickener material.

With soils having a negative zeta potential, the asphalt emulsion suspended in the second solution comprises a cationic asphalt emulsion. The cationic surfactant used in preparation of this emulsion has a zeta potential which is no greater than the zeta potential of the cationic surfactant contained in the first solution. Otherwise, diffusion of the asphalt emulsion through the volume of soil is impaired.

When such an asphalt emulsion is injected into the soil through probe 10, it diffuses outwardly through the soil until it reaches additional soil surrounding volume 16. As this additional untreated soil is still anionic, its soil particle charge having not been neutralized, asphalt emulsion begins to electrostatically bond to the untreated soil particles. Because the affinity of the untreated soil particles for ions is stronger than water, the water suspension of the asphalt emulsion is destroyed. Consequently, a layer of asphalt emulsion electrostatically bonded to this untreated soil forms. As a result, this soil is converted from a hydrophilic to a hydrophobic condition. Furthermore, the bond makes this asphalt emulsion layer resistant to stripping by percolating ground water so that a long lasting electrode is produced. Thus, the cationic asphalt emulsion forms a water repellant layer at least partially surrounding the treated volume 16.

In addition, with complete diffusion of the asphalt emulsion suspended in water through the volume, a deposited asphalt emulsion shell completely enclosing the treated volume of soil 16 is formed. This shell prevents ground water from entering into volume 16 as well as prevents outward leaching of electrolyte from the volume. At the same time, this asphalt emulsion layer is electrically conductive.

The deliquescent material contained in the second solution is preferably a dissolved deliquescent salt such as calcium chloride (CaCl$_2$). Such a salt draws moisture from soil surrounding volume 16 into the volume. This occurs prior to formation of the water repellant shell surrounding the volume so that when the shell is formed, water drawn into the volume is trapped inside. This moisture helps maintain the electrolyte within the volume in an ionized state so that the conductivity of volume 16 is improved. Furthermore, because this moisture is trapped within the volume, its conductivity is virtually unaffected by changes in moisture content of surrounding soil.

The thickener utilized in the second solution is an electrically neutral filler material included to fill voids within soil surrounding volume 16. One suitable thickener would be a finely divided clay in admixture with a cationic surfactant. The concentration of the thickener would depend upon the porosity of the soil being treated. For most soils, a 10 weight percent to 30 weight percent pretreated clay solution is suitable.

The second solution may be injected into the soil immediately following the first solution.

As a specific example, one suitable second solution comprises 100 milliliters cationic asphalt emulsion per liter of solution, 378 grams calcium chloride per liter, and 900 milliliters water per liter.

In laboratory tests of certain soils the following resulted. Prior to treatment, the soil ranged in resistivity from 15-50 kilohm-centimeters and averaged 25 kilohm-centimeters. Immediately after treatment in accordance with the above method, the resistivity dropped to a 25 ohm-centimeter average. Furthermore, after 8⅓ simulated years of 47 inches per year rainfall, the resistivity of the soil had only increased to 75 ohm-centimeters.

It should be noted that only one method of forming the grounding electrode of the above invention has been described. It is of course understood that the electrode can be formed in many other ways. For example, a volume of soil can be excavated from beneath a proposed electrical installation. Cationic asphalt emulsion can then be applied to soil bounding the excavated volume to form the water repellant layer. Subsequently, an electrolytic containing soil can be backfilled into this excavation.

Having illustrated and described the principles of my invention with reference to one preferred embodiment, it should be apparent to those skilled in the art that such invention may be modified in arrangement and detail without departing from such principles. I claim as my invention all such modifications which come within the true spirit and scope of the following claims.

I claim:

1. A soil treating method comprising:
   enhancing the electrical conductivity of a volume of soil in contact with additional soil; and
   enclosing the volume of soil with a water repellant electrically conductive shell bonded to the additional soil.

2. A soil treating method according to claim 1 in which the enhancing step comprises the step of treating the volume of soil by introducing an electrolytic solution into the volume, and in which the enclosing step comprises the step of diffusing through the treated volume a second solution which bonds with the additional soil so as to form the shell.

3. A method of forming an underground grounding electrode comprising:
   injecting a first solution into a volume of soil so as to lower the electrical resistance of the volume; and then
   injecting an electrically conductive second solution into the volume which diffuses through the volume and forms a water repellant electrically conductive layer bonded with soil outside of the volume.

4. A method according to claim 3 in which the first solution contains a charge neutralizing material for neutralizing surface charges of soil particles within the volume and the second solution contains a material in suspension with a surface charge of a sign opposite to that of the soil particles within the volume and which is of a magnitude such that the second solution diffuses through the volume.

5. A method according to claim 4 in which soil particles within the volume have a negative zeta potential and the neutralizing substance comprises a cationic surfactant with a positive zeta potential of a magnitude not less than the magnitude of the zeta potential of the soil particles within the volume.

6. A method according to claim 3 in which the second solution includes a deliquescent material which draws water into the volume from soil surrounding the volume, and in which the second solution forms a water repellant shell surrounding the volume and traps the water drawn into the volume within the volume.

7. A method of increasing the electrical conductivity of a volume of soil having soil particles with a negative surface charge comprising:
   injecting a first solution into the volume so as to diffuse throughout the volume and enhance its conductivity, the first solution including cations and a first cationic surfactant having a zeta potential such that the surface charge of soil particles within the volume is neutralized by the first surfactant; and
   injecting an electrically conductive second solution into the volume which diffuses through the volume and forms an electrically conductive water repellant shell surrounding the volume, the second solution containing a dissolved deliquescent salt for drawing water from soil surrounding the volume into the volume prior to formation of the shell and a cationic asphalt emulsion which diffuses through the first solution and forms the shell, the cationic asphalt emulsion being formed with a second cationic surfactant having a positive zeta potential which is not greater than the zeta potential of the first cationic surfactant.

8. A method according to claim 7 in which the second solution includes a thickener in suspension for filling voids in the volume.

9. A method according to claim 7 in which the cations contained in the first solution are selected from the group consisting of $Al^{+++}$, $Li^+$, $Mg^{++}$, $Ni^{++}$, $Co^{++}$, $Zn^{++}$, and $Fe^{++}$.

10. A method according to claim 9 in which the deliquescent salt comprises calcium chloride.

11. A method of electrically grounding a structure comprising:
   injecting a first solution into a volume of soil adjacent to the structure, the first solution containing cations and a cationic surfactant for neutralizing the surface charge of soil particles within the volume;
   injecting a cationic electrically conductive asphalt emulsion into the volume which diffuses through the volume and forms a water repellant electrically conductive shell surrounding the volume; and electrically connecting the structure to the volume.

12. A method according to claim 11 including the steps of repeating first injection, second injection and connection steps a plurality of times to thereby provide a plurality of treated soil volumes connected to the structure.

13. A grounding electrode produced by the method of claim 3, 4, 5, 6, 7, 8 or 9.

14. A grounding electrode comprising:
a volume of soil containing an electrolyte; and
an electrically conductive asphalt emulsion layer at least partially enclosing the volume of soil.

15. A grounding electrode according to claim 14 in which the asphalt emulsion layer is bonded to additional soil outside of the volume of soil.

16. A grounding electrode according to claim 14 in which the volume of soil contains a charge neutralizing material for neutralizing the charge of soil particles within the volume.

17. A grounding electrode according to claim 16 in which the volume of soil contains cations, a deliquescent material and in which the neutralizing material is a cationic surfactant.

18. A grounding electrode according to claim 15 or 17 in which the asphalt emulsion layer is electrostatically bonded to additional soil surrounding the volume and forms a water repellant shell enclosing the volume of soil.

* * * * *